Sept. 17, 1940.     H. S. JANDUS     2,215,001
BUMPER AND GUARD ASSEMBLY
Filed July 28, 1939
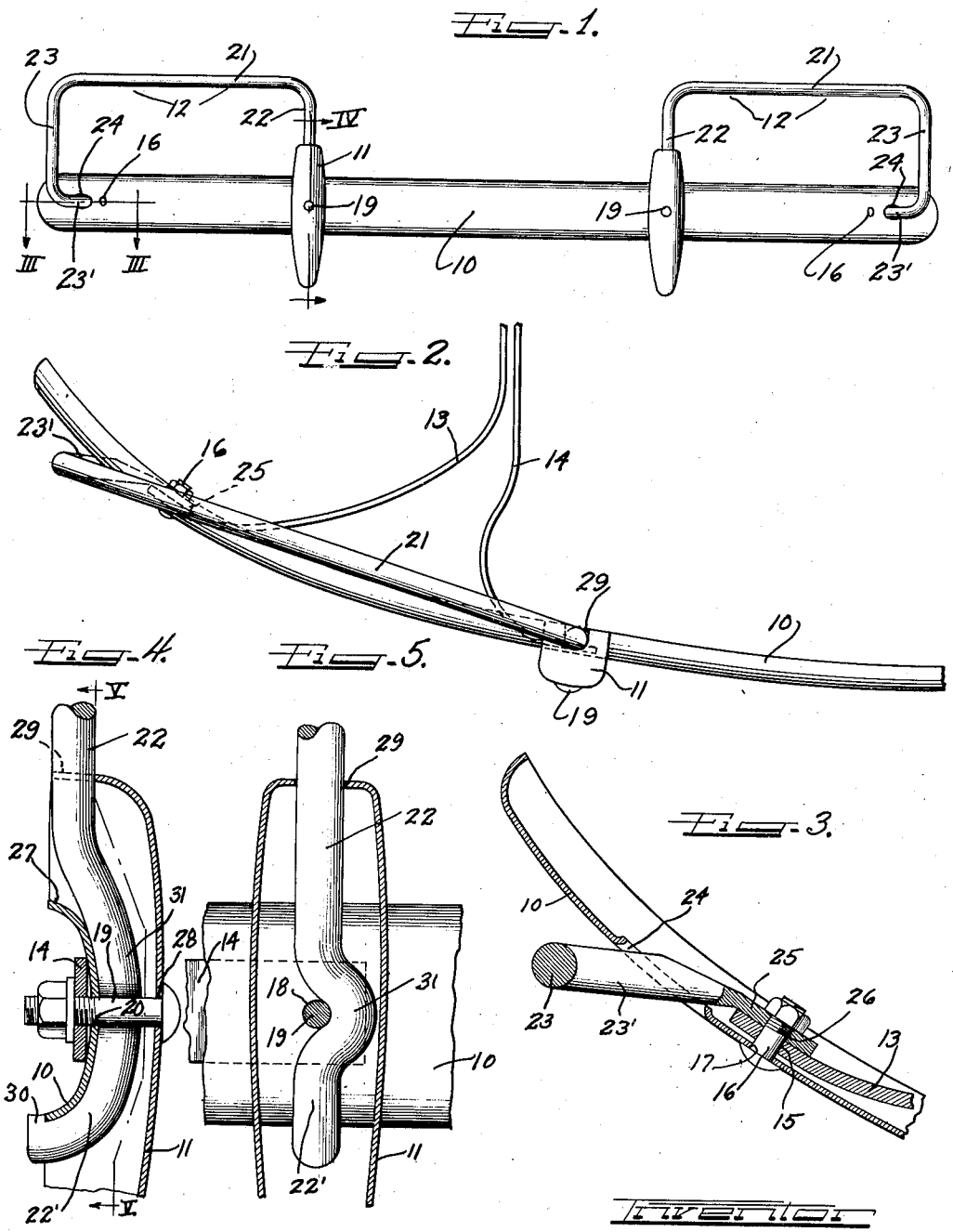
Inventor
HERBERT S. JANDUS.

Patented Sept. 17, 1940

2,215,001

UNITED STATES PATENT OFFICE 2,215,001

BUMPER AND GUARD ASSEMBLY

Herbert S. Jandus, Detroit, Mich., assignor to Houdaille-Hershey Corporation, Detroit, Mich., a corporation of Michigan Application July 28, 1939, Serial No. 286,984

9 Claims. (Cl. 293—55)

My invention relates to bumper and guard structure for automotive vehicles and particularly to an improved assembly comprising a bumper impact bar and guard and protective elements for protecting vehicle parts such as the fender structure and also for preventing bumper interlock.

The important object of the invention is to produce a simple and efficient assembly comprising a main bumper bar with transversely extending guard elements thereon inwardly of its ends, and with auxiliary protection bars or rails extending between the guard elements and the impact bar ends.

A further important object is to provide improved and simplified means for mounting and securing the auxiliary protection element to the bumper impact bar and to the supporting structure for such bar.

The various features of the invention are incorporated in the structure shown on the drawing, in which Figure 1 is a front elevation of the bumper and protection assembly;

Figure 2 is an enlarged plan view of one end of the assembly;

Figure 3 is an enlarged section on plane III—III of Figure 1;

Figure 4 is an enlarged section on plane IV—IV of Figure 1; and

Figure 5 is a section on plane V—V of Figure 4.

The assembly shown comprises the main impact bar 10 of a vehicle bumper structure, the transverse guard elements 11, and the auxiliary guard and protection rails or bars 12. In the arrangement shown, there are two transverse guard elements 11 applied to the bumper bar a distance inwardly from the ends thereof, while the rails 12 are above the impact bar and extend between the guard elements and the impact bar ends.

As shown by Figure 2, the assembly is supported from the vehicle structure at each end by outer and inner supporting bars 13 and 14 adapted at their inner ends for attachment to usually the side beams of the vehicle chassis. The outer supporting bar 13 at its forward end curves gradually forwardly and laterally and is provided at its ends with a bolt hole 15 for receiving a bolt 16 which is projected through the bolt hole 17 in the impact bar for securing the bar to the supporting bar. The inner supporting bars 14 at their forward ends are deflected laterally and have the bolt hole 18 for a bolt 19 which is projected through the bolt hole 20 in the impact bar for securing the impact bar to the supporting bar. The bolts 16 and 19 will serve also to secure the guard elements 11 and the auxiliary protective structure 12 in the assembly.

The protective structures 12 are each preferably formed integral and as shown are formed by bending and shaping a length of cylindrical rod. Each structure comprises the rail part 21 shown as extending above and parallel with the impact bar 10, and the downwardly extending inner and outer legs 22 and 23. The outer legs 23 extend downwardly adjacent to the outer ends of the impact bar 10 and in front thereof laterally outwardly of the bolt holes 20 in the impact bar. Between the bolt hole 20 and the outer leg 23 of the structure 12, the impact bar at each end has the opening 24 therethrough, and the lower part of each leg 23 is deflected laterally inwardly and inclined slightly rearwardly so that it may be projected through the opening 24 into position behind the impact bar as clearly shown on Figure 3. This deflected portion of the leg 23 has the flattened end 25 which is deflected so that it will engage against the rear side of the end of the supporting bar 13 and is provided with a bolt hole 26 for receiving the bolt 16, so that the bolts 16 will serve to secure together the outer ends of the outer supporting bars 13, the impact bar 10, and the outer ends of the protective structures 12. The openings 24 in the impact bar are sufficiently elongated so that the flattened ends 25 of the protective structures may be readily projected therethrough.

The guard structures 11 shown are of channel shape cross section with their side walls having the recesses 27 at their edges for receiving and accurately fitting the transverse curvature of the front face of the impact bar, as clearly shown on Figure 4. The front wall of each guard structure has the bolt hole 28, these bolt holes receiving the bolts 19 which serve also to secure the impact bar to the front ends of the inner supporting bars 14 as has already been explained, the guard structures being thus securely held to the impact bar.

The inner legs 22 of the protective structures 12 extend downwardly through the respective guard elements 11 and in front of the impact bar 10, the top walls of the guard structures being provided with the passageways 29 for the legs 22. As clearly shown on Figure 4, the end portions 22' are curved to fit the curvature of the front face of the impact bar, the ends of the deflected portions being preferably formed to provide abutments 30 for engaging against the lower edge of the impact bar as clearly shown on Figure 4. The deflected portions 22' are also provided with the lateral bends or offsets 31 to clear the bolts 19, as shown on Figures 4 and 5. When the bolts 19 are applied and tightened, these offset portions 31 will be held between the adjacent side walls of the guard elements 11 and the bolts 19. The legs 22 of the protective structures 12 will thus be rigidly locked against the impact bar against displacement.

In the arrangement shown, the upper or rail portions 21 of the protective structures 12 are straight but it is evident that these rail portions could be curved to parallel the longitudinal curvature of the impact bar, or could be otherwise curved or shaped as desired. With the protective structures 12 extending between the guard structures 11 and the ends of the impact bar 10, they will be in front of the vehicle fender structure and accessories such as lamps mounted on the fender structures for protection against bumps.

The protective structures 12 could form part of standard bumper equipment, or could be used as accessory equipment. The impact bar 10 could be provided with the holes 24 so that if the protective structure 12 were desired to be added as accessory equipment it could be readily applied. In the absence of such accessory equipment, the holes 24 could be closed by cover plates (not shown) which could be easily removed for application of the accessory structure.

I have shown a practical and efficient embodiment of the features of my invention but I do not desire to be limited to the exact construction, arrangement, and operation shown and described as changes and modifications may be made without departing from the scope of the invention.

I claim as follows:

1. A bumper and guard assembly comprising a bumper main impact bar, an integral protective guard structure comprising a rail portion vertically displaced from said impact bar and end portions extending in directions transversely of said impact bar, means securing one of said guard structure ends against the impact bar, and an opening through the impact bar adjacent to the other end of said guard structure, such other end being deflected to extend for a distance in front of said impact bar and then through said opening to terminate behind the impact bar parallel therewith, and means for securing said other end to the impact bar.

2. A bumper and guard assembly comprising a bumper main impact bar, said bar having an opening therethrough a distance inwardly from each end thereof, integral guard structures each comprising a rail portion vertically spaced above the impact bar and having inner and outer depending legs extending transversely in front of the impact bar, means securing the inner legs of said guard structures to the impact bar, the ends of the outer legs being deflected to extend laterally inwardly a distance in front of the impact bar and then through said impact bar openings to terminate behind the impact bar parallel therewith, and means for securing the projected portions to the impact bar.

3. A bumper and guard structure for automotive vehicles comprising a main impact bar, transversely extending guard elements on said bar inwardly from the ends thereof, openings through the impact bar adjacent the ends thereof, protective structures each comprising a rail portion above the impact bar and depending inner and outer legs terminating in front of said impact bar, means securing said guard elements and the inner legs of said protective structures to the impact bar, the end portions of the outer legs of said protective structures being extended through said impact bar openings to the rear side of the impact bar, and means for securing said deflected ends to the impact bar.

4. In a bumper and guard assembly, a main bumper impact bar, a guard element extending transversely of said impact bar, said impact bar having an opening therethrough adjacent to the end thereof, a protective structure comprising a rail part above the impact bar and inner and outer legs extending downwardly in front of the impact bar, said inner leg extending through said guard element to be secured thereby to the impact bar, the end portion of said outer leg being deflected through said opening to the rear side of said impact bar, and means for securing said deflected end to the impact bar.

5. In a bumper and guard assembly, a bumper main impact bar, a guard body extending transversely of said impact bar, said impact bar having an opening therethrough displaced from said guard body, a guard rail above the impact bar having inner and outer depending legs, said inner leg paralleling said guard body, means securing said guard body and inner leg to the impact bar, said outer leg being deflected rearwardly through said impact bar opening to the inner side of said impact bar, and means for securing said outer leg to the impact bar.

6. A bumper and guard assembly comprising a bumper impact bar for extending transversely across the end of a vehicle, said bar having openings therethrough inwardly of its ends, a guard structure extending above the impact bar parallel therewith, the end portions of said guard structure extending downwardly in front of the ends of the impact bar and then deflecting laterally inwardly a distance in front of the bar and then through said openings to terminate against the inner side of the impact bar, and means for securing said deflected ends to the impact bar.

7. A bumper and guard assembly comprising a bumper impact bar for extending transversely across the end of a vehicle, said bar having openings therethrough adjacent to its ends, supporting structure for each end of said impact bar comprising outer and inner supporting bars, a guard structure for each end of said impact bar comprising a rail portion above the bar and inner and outer downwardly directed legs, means securing the inner leg of each guard structure and the corresponding inner supporting bar to said impact bar, the outer leg of each guard structure being deflected at its lower end to project rearwardly through the corresponding impact bar opening to the inner side of the impact bar, and means for securing the deflected end of each guard structure and the end of the corresponding outer supporting bar to the impact bar.

8. A bumper and guard assembly comprising a main impact bar, a guard structure having depending legs terminating in front of the impact bar, said impact bar having a hole therethrough adjacent to the end of one of said legs and said leg being deflected to extend through said hole into engagement with the rear side of said impact bar, means for securing said end to the impact bar, a guard body receiving the end of said other leg, and means for securing said guard body to the impact bar and to clamp the received leg to the impact bar.

9. A bumper and guard assembly comprising a bumper impact bar for extending transversely across the end of a vehicle, a supporting bar for each end of the impact bar, said impact bar having openings therethrough adjacent to the ends of said supporting bars, a guard structure for each end of the impact bar comprising a rail portion above the bar and inner and outer depending legs, means securing the inner leg of each guard structure to the impact bar, the outer leg of each guard structure being deflected at its lower end to project rearwardly through the corresponding impact bar opening to the inner side of the impact bar, and means for securing the deflected end of each guard structure and the end of the corresponding supporting bar to the impact bar.

HERBERT S. JANDUS.